Nov. 23, 1971
G. D. REMMERY  3,621,536
APPARATUS FOR REMOVING A PLUG OF MOLDING MATERIAL FROM THE
INJECTION PASSAGE OF A MOLD
Filed Nov. 13, 1969
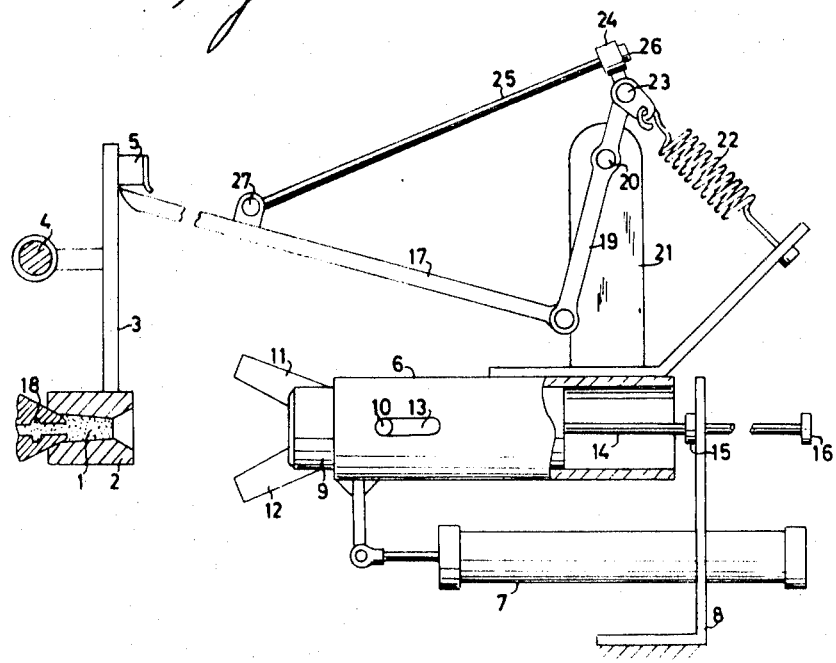
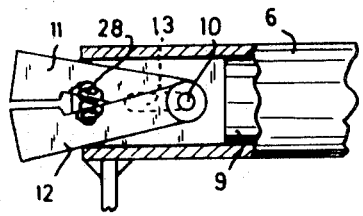
INVENTOR
Germain D. REMMERY
BY
ATTORNEY United States Patent Office
3,621,536
Patented Nov. 23, 1971

3,621,536
APPARATUS FOR REMOVING A PLUG OF MOLDING MATERIAL FROM THE INJECTION PASSAGE OF A MOLD
Germain D. Remmery, St. Amandsberg, Belgium, assignor to ACEC Ateliers de Constructions Electriques de Charleroi
Filed Nov. 13, 1969, Ser. No. 876,233
Claims priority, application Belgium, Nov. 14, 1968, 66,072
Int. Cl. B29f 1/00
U.S. Cl. 18—30 NR 2 Claims

ABSTRACT OF THE DISCLOSURE

Apparatus for removing a plug of molding material from the injection passage of a mold including a slider displaceable in rectilinear movement toward and away from the plug and a piston slidably mounted in the slider so as also to be displaceable toward and away from the plug. The piston is provided with a pair of jaws articulated at one end to pivot about an axis transverse to the direction of movement of the piston and slider. The piston has a rod provided with a pair of thrust members arranged on either side of a stationary frame whereby to limit the displacement of the piston. A cutout is formed on the wall of the slider to allow opening and closing of the jaws while a spring biases the jaws toward open position.

---

The present invention relates to machines for the molding of articles made of plastic material and particularly the soles of shoes.

In such machines, as is known, the residual material remains in the injection passage of the mold in the form of a short plug after operation and withdrawal of the injection head. In order to be able to reach this plug, communication between the injection head and the mold injection passage is obtained through a conduit formed in an intermediate member carried at the end of a pivotable lever. By removing this intermediate member, the plug that is formed therein and which is an extension of the one formed within the mold injection passage, can be gripped. A mechanism, provided with grippers, then comes into action. The grippers, by moving closer, actuate the pivotable lever carrying the intermediate member, by means of a thrust member mounted thereon, thus freeing it. The gripper then grips the plug, the mechanism withdraws while pulling it out, the grippers open and the plug drops into a container.

The operation of such a mechanism is rather complex and requires the use of several hydraulic cylinders in order to obtain the various movements. The apparatus according to the present invention is much simpler and only requires a single hydraulic cylinder or other driving means. It is characterized in that it comprises a slider reciprocable along the axis of said molding injection passage; a piston slidably mounted in the slider for relative displacement along the said axis; a pair of jaws articulated at one end to the piston to pivot about an axis transverse to the direction of relative movement of the piston and of the slider; the jaws being movable towards closed and opened positions to grip and release the plug, respectively; means is provided to stop the displacement of the piston together with the slider and to allow relative displacement therebetween as the slider moves further, such means comprising a frame fixed in relation to the slider, a rod connected to the piston and extending freely across the frame and thrust members spacedly secured on the rod and on either side of the frame to limit the movements of the piston and cause the relative displacement; the improvement further comprising means to cause operation of the jaws as the relative movement takes place.

In the drawings, FIG. 1 is an elevation view, partly in cross-section, of the device of the invention, and FIG. 2 a cross-section view of a detail.

The figure illustrates a device adapted to extract a plug 1 after injection of a mold, not shown, communicating with the injection head by means of an intermediate member 2 having an axial conduit extending that of the mold. Member 2 is carried by the end of a lever 3 capable of pivoting about an axle 4 and the opposite end of which is provided with a projection 5. The extracting device or apparatus comprises a slider made up by a hollow cylinder 6 capable of being displaced in both directions, according to the axis of the injection passage of the mold, by the action of a hydraulic cylinder 7 secured to a frame 8 of the installation. The cylinder 6 is carried by guiding members, not shown, also secured to frame 8. Inside cylinder 6, there is provided a sliding piston formed by a solid cylinder 9 provided with a transverse axis 10 about which two jaws 11 and 12 are articulated. As illustrated in FIG. 2, showing a partial cross-section view of the end of the hollow cylinder 6 with piston 9 in withdrawn position, the end of said piston is longitudinally slit by two parallel planes perpendicular to transverse axis 10 so as to form a fork between the branches of which the jaws 11 and 12 may move by rotation about axis 10 and the latter are subjected, by means of spring 28, to a mutual spreading force. In this manner, if the piston 9 moves out of cylinder 6, the jaws 11 and 12 then open.

The ends of axle 10 are engaged in elongated slot 13 formed in the wall of the hollow cylinder 6. Piston 9 is solid with a rod 14 provided with two thrust members 15 and 16 and passing through an opening made in the frame 8 that serves as abutment for the two thrust members which are provided on either side thereof. When cylinder 6 moves toward the mold, the jaws remain open until the thrust member 16 comes against the stop provided by the frame 8. Cylinder 6 then continues in its movement, piston 9 reenters the cylinder 6 and the jaws close. If the cylinder 6 moves away from the mold, the jaws remain closed until the thrust member 15 comes to a stop, causing egress of piston 9 and opening of the jaws.

Cylinder 6 is provided with an arm 17, one end of which serves to cause rocking of the intermediate member 2 by thrust action, whereby to release plug 1. According to a known arrangement, the injection passage of the mold defines an annular groove 18 serving to increase the adherence of the plug and thus preventing that it be driven along with the intermediate member 2. Arm 17 is articulated on the end of a second lever 19 pivoting about an axle 20 solid with a support 21 secured to cylinder 6. The other end of second lever 19, subjected to the bias of a return spring 22, is connected to a bearing 24 by an articulation about an axle 23. Bearing 24 slides on a bar 25 provided at one end with a thrust member 26 to stop bar 25 against bearing 24 and, at its other end, with an articulation about an axle 27 solid with arm 17.

When arm 17 touches the first lever 3 beneath the projection 5 with the mechanism moving toward the mold, lever 3 pivots and the intermediate member 2 moves away, freeing the end of the plug 1. The stroke of cylinder 6 may thereafter continue since the second lever 19 pivots about the axle 20 under the action of the arm 17, expanding the spring 22 whereas the bearing 24 slides along bar 25. During that time, the jaws come closer to the plug 1, the thrust member 16 comes to a stop and the jaws 11, 12 close on the plug 1. Then, cylinder 6 moves away, the plug is pulled out and continues to be clamped between the jaws until the thrust member 15 comes to a stop against frame 8. Piston 9 moves out of cylinder 6, the jaws open and the plug falls into a container.

It can be seen that the above-described apparatus operates with a single hydraulic cylinder that may also be used to simultaneously operate other identical mechanisms relative to adjacent molds.

I claim:

1. In an apparatus for the removal of injection molding residue in the form of a plug remaining in the injection passage of a mold in a molding machine where the said injection passage communicates with an injection head through a conduit formed in an intermediate member carried at the end of a pivotable lever, the improvement comprising: a slider reciprocable along the axis of the molding injection passage; a piston slidably mounted in said slider for relative displacement along said axis of said passage; a pair of jaws articulated at one end to said piston to pivot about an axis transverse to the direction of relative movement of said piston and slider; said jaws being movable toward closed and opened positions to grip and release said plug, respectively; means to stop displacement of said piston together with said slider and allow relative displacement therebetween as said slider moves further, said stopping means comprising: a frame fixed in relation to said slider, a rod connected to said piston and extending freely across said frame, and thrust members spacedly secured on said rod and on either side of said frame to limit the movements of said piston and cause said relative displacement; the improvement further comprising means to cause operation of said jaws as said relative movement takes place.

2. Apparatus according to claim 1 wherein said means causing pivoting of said pivotable lever comprises: a second lever mounted to pivot intermediate the ends thereof about an axis displaceable with said slider; an arm pivoted at one end to one end of said second lever, the other end thereof being applicable against said first lever to cause pivoting thereof; resilient means between the other end of said second lever and said slider to bias said arm toward said first lever; a bearing at said other end of said second lever, and a bar pivoted at one end to said arm and slidable at the other end through said bearing, whereby said arm, second lever and rod form the three sides of a deformable triangle.

References Cited

UNITED STATES PATENTS

| | | | |
|---|---|---|---|
| 2,386,034 | 10/1945 | Church | 18—2 RM X |
| 3,197,811 | 8/1965 | Workman | 18—2 RM X |
| 3,208,113 | 9/1965 | Bennett | 18—Dig. 51 UX |

H. A. KILBY, Jr., Primary Examiner

U.S. Cl. X.R.

18—2 RM, Dig. 51